United States Patent
Crane et al.

(10) Patent No.: US 6,201,924 B1
(45) Date of Patent: Mar. 13, 2001

(54) DISK-ASSISTED EDITING FOR RECORDED VIDEO MATERIAL

(75) Inventors: Stephen E. Crane, Menlo Park; LeeAnn Heringer, San Jose; Michael Shinsky, Menlo Park; Gerald A. Raitzer, Mountain View; Michael A. Ogrinc, San Francisco; Steven T. Mayer, Palo Alto, all of CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 08/482,905

(22) Filed: Jun. 7, 1995

Related U.S. Application Data (63) Continuation of application No. 08/193,621, filed on Feb. 8, 1994, now abandoned, which is a continuation of application No. 07/590,061, filed on Sep. 28, 1990, now abandoned.

(51) Int. Cl.$^7$ ..................................................... H04N 5/76
(52) U.S. Cl. ................................. 386/52; 386/55; 386/64
(58) Field of Search ..................................... 358/335, 342, 358/311, 310; 360/13.1, 14.1, 14.2, 14.3, 13; 386/52–64, 4; 369/83; 345/328; H04N 5/76, 5/78, 5/781, 5/782, 5/783, 5/92, 9/79

(56) References Cited

U.S. PATENT DOCUMENTS

| | | | |
|---|---|---|---|
| 4,100,607 | * 7/1978 | Skinner | 360/14.2 |
| 4,417,276 | * 11/1983 | Bennett et al. | 358/160 |
| 4,489,351 | * 12/1984 | d'Alayer de Cost. d'Arc | 358/906 |
| 4,618,895 | * 10/1986 | Wright | 358/311 |
| 4,685,003 | * 8/1987 | Westland | 360/14.1 |
| 4,698,664 | * 10/1987 | Nichols et al. | 358/311 |
| 4,746,994 | * 5/1988 | Ettlinger | 360/13 |
| 4,754,342 | * 6/1988 | Duffy | 360/14.1 |
| 4,868,687 | * 9/1989 | Penn et al. | 360/13 |
| 4,956,707 | * 9/1990 | Oakley et al. | 358/185 |
| 4,972,274 | * 11/1990 | Becker et al. | 360/15 |
| 4,974,111 | * 11/1990 | Platte et al. | 358/311 |
| 4,974,178 | * 11/1990 | Izeki et al. | 364/523 |
| 5,012,334 | * 4/1991 | Etra | 358/311 |
| 5,051,835 | * 9/1991 | Brueht et al. | 358/311 |
| 5,051,845 | * 9/1991 | Gardner et al. | 360/14.1 |
| 5,060,280 | * 10/1991 | Mita et al. | 382/33 |
| 5,146,592 | * 9/1992 | Pleiffer et al. | 395/157 |
| 5,206,929 | * 4/1993 | Langford et al. | 358/311 |

\* cited by examiner

*Primary Examiner*—Thai Tran
(74) *Attorney, Agent, or Firm*—Fish & Richardson P.C.

(57) ABSTRACT

A disk-assisted system for editing video tapes. Source material from video tapes is logged onto random access storage such as a hard disk drive using of a Macintosh-based computer system. At any one time, only a small portion of the tape material is stored as video frames on the computer disk. By software control, material is cached back and forth between the computer disk and the video tape. Thus editing is accomplished and an edit decision list constructed for compilation of the final video production. This provides the advantage of fast access time for editing of the material which is on the disk while allowing actual physical editing at the end of the project of the actual video tape material. The processes of logging the material onto the disk and editing the final tape are performed automatically.

22 Claims, 3 Drawing Sheets

Microfiche Appendix Included
(2 Microfiche, 173 Pages)

DISK-ASSISTED EDITING FOR RECORDED VIDEO MATERIAL

This application is a continuation of application Ser. No. 08/193,621, filed Feb. 8, 1994 (abandoned) which is a continuation of application Ser. No. 07/590,061, filed Sep. 28, 1990 (abandoned).

BACKGROUND OF THE INVENTION

1. Microfiche Appendix

This patent disclosure includes a computer program in a microfiche appendix which has 173 total frames and 2 fiche.

2. Field of the Invention

This invention relates to editing video tape by a computer-based system which includes a random access memory device such as a disk drive. More specifically, the invention relates a method and apparatus for storing portions of video taped material on disk and using the information on the disk to edit the taped material. In one embodiment, the computer platform is a Macintosh computer.

3. Description of the Prior Art

Various methods of video tape editing are well known in the art. Traditional editing is tape-based; the editor cycles tapes back and forth on a source VCR (video cassette recorder) or VTR (video tape recorder) to find the scene that he means to edit. He positions the record (destination) tape on the record (destination) VCR to receive the scene from the source tape. Then the scene from the source tape is recorded on the record tape; this process is repeated for each successive scene. This linear process requires constant cycling of tapes.

Also known is disk-based editing wherein a computer system including a random storage rotating memory device such as a hard disk drive, optical, or magneto-optical disk drive. All the video material is stored on a disk drive controllable by a computer used as an editor. Then random access of the disk via the computer finds any frame in the stored video material virtually instantaneously. The computer keeps track of all the edit and record frames for the entire production. When the edit decisions of the program are completed, the editor inserts source tapes in one or more VTR's and a new record tape into the record VCR and the computer executing the edit decision list created when using the disk video records the entire edited program onto the tape. Disk-based editing is fast, easy, and vastly reduces tape handling and is currently used by professional editing companies and movie studios.

However, even with such professional systems, the problem remains that a disk drive can only store a very short amount of video material. Typically, 300 megabytes or more of disk storage are needed to edit even a relatively short 10 minute program or film. Also, fast access disks (such as 16 milliseconds or less) are needed. This prohibits use of typical magneto-optical disks. Thus the disk-based systems are expensive and need large amounts of disk storage.

Additionally, disk-based editing typically requires logging the video material from the tape onto the disk which is a separate and time consuming step. This step is especially problematic when many hours of video material are available, such as when editing a film in which typically 10 to 20 times as much material is recorded as is needed for the final production. In this case, disk-based editing is virtually impossible except for short segments of the project. For instance, it requires 22 megabytes of disk capacity to store one minute of highly compressed source video. One hour of source video therefore requires approximately 1.3 gigabytes of storage. Thus even a very expensive disk-based system is not capable of storing a large amount of video recorded material. Without compression of the video, the cost of disk storage would rise dramatically. One commercial system costing $60,000 stores only 25 seconds of uncompressed video. The effects of compression result in significantly degrading the quality of the video signal to the point of making it impossible to make critical edit decisions.

Therefore, the prior art systems suffer from the deficiency in the on-line system using physical tapes of having very slow access times, and in the case of the off-line disk-based systems, of being quite expensive and also only allowing the editor to work with a limited amount of video material at any one time and with reduced video quality. Additionally, the disk-based systems have the deficiency of requiring a separate step of logging the video material onto the disk and then after editing of generating an edit list and using that to edit the actual video tape.

SUMMARY OF THE INVENTION

In accordance with the present invention, a disk-assisted editing system and method is provided. The computer system including a mass storage device such as a disk drive used for interactive editing of video material caches that portion of the information which is in use from video tape to the disk. Actual editing of the tape is done by an edit decision list generated by the computer. "Video" optionally includes audio, and can include just audio, excluding the video.

In one embodiment, the material from the tape as it is viewed by the editor is automatically logged on to the disk by an algorithm which determines that only a portion of each scene i.e., typically a few seconds at the beginning and end of each scene, are stored on disk. Optionally, all of certain scenes is stored on the disk. Also provided is a "least-used" algorithm for conserving disk space by removing from the disk those scenes or portions of scenes not in current use. The original taped material is always available by means of tape recorders connected to and controlled by the computer system. The video material is reclaimed from the tape as needed.

The video information recorded on a disk is in one embodiment stored by means of conventional video compression techniques, so as to conserve disk space. This is not a problem because the original video information is accessible at all times from the tapes which as discussed above are kept on video tape recorders connected to the computer. Thus the disk is a "virtual VTR", because to the editor it appears that he is using a physical VTR in terms of the editing and VTR controls. Also provided in addition to standard full-motion video are graphics, still frame video, and audio. All of these may be edited. One embodiment of the invention uses a conventional Macintosh computer as a platform with additional hardware for interfacing and controlling the VTRs and viewing the video material.

In one embodiment of the invention, in addition to use of a conventional magnetic disk drive for interactive editing, a magneto-optical disk drive (capable of being removed from the computer for storage and transportability unlike larger magnetic disk drives but with slower access speeds) or local area networks, such as Ethernet and Apple Talk are intermediary storage devices between the magnetic disk drive and the physical video tapes. The slower drives and networks automatically display more time compressed video (i.e. 10 frame per second vs. 30 frame per second video).

Alternatively one can use the slower drives or networks to feed faster disk drives (as a back-ground or batch process) that can keep up with the 30 frames per second display rate.

In accordance with the invention, the computer effectively stores pointers to particular video frames denoted by conventional SMPTE time codes on the video tapes. The pointers act as a computer data base and are manipulated as is a conventional computer data base to perform editing tasks.

Thus advantageously the system allows caching of information back and forth between the relative high access speed, low capacity magnetic disk and the low access speed, high capacity video tapes to allow interactive editing at high speed while maintaining the highest possible video quality, with the actual high quality video material at all times remaining available on the video tapes. The system compiles an edit list so it is possible to go back to the actual tapes to assemble the file material. The video tape recorders are physically connected to the computer so that information from them may be drawn upon as desired during the actual editing process. Thus the system simultaneously has both (1) an on-line capability for executing an edit list recording information from source tape to record tape; and (2) an off-line capability for only creating the edit list but not recording high quality video from source tape to record tape, and the system interactively moves between these two capabilities. The off-line system (like disk-based editing) requires fast random access that somewhat reduces quality of video and audio. The on-line system requires high quality audio and video with full post-production capabilities to provide a polished final version of the material. The combined system allows this with transparency to the editor i.e., he is able to move smoothly between an off-line mode and an on-line mode.

In one embodiment, the disk-assisted editing system is a computer network which includes video tape recorders, mass storage random access devices, and one or more computers for control thereof. This system is tied together by the above described database relating to the video material. The database serves as a master decision which pertains to the information stored in the various storage devices and unifies the various physical expressions of the video material as stored on the different storage devices. The master decision list (MDL) allows the editor to move information about a video project between individuals and also to the next level of storage and to perhaps a higher level as desired depending on the equipment i.e, hardware, connected to the network and/or to the quality of video which is desired.

The MDL as described in copending U.S. patent application Ser. No. 07/346,864, attorney docket no. M-683, (incorporated by reference) includes video tape information, SMPTE time codes and selected additional information as common in the video industry, and also is an extensible data base that includes extended information about the video creation of editing process as a key-frame-oriented sequence.

DETAILED DESCRIPTION OF THE INVENTION

Description of Equipment

In accordance with the invention, a computer system is used in conjunction with the video equipment for purposes of editing video material. Other aspects of this system are disclosed in copending application Ser. No. 7/595,452, attorney docket no. M-1424, entitled "Computer Generated Wipes for Video Editing Systems" invented by Robert J. Alig et al., incorporated by reference. The editor produces master decision list which includes a detailed list of each edit decision which he makes. The decision list is the data base of information for creating an entire video tape production. An edit decision list (which is a subset of the master decision list) may be produced in an industry standard format (known as CMX-compatible) usable by commercial post-production companies to edit tape on their advanced editing systems without any additional formatting being necessary. Once the editor has made his editing decisions the system automatically records the final master video tape from the master decision list. A system capable of executing the instructions in the MDL then finds the right frame to reach each scene, inserts all of the titles and other graphics which the editor has designated, make all the transitions between scenes, and other transformations, start and stop the appropriate audio tracks in accordance with the desired editing decisions, and adjust the video and audio levels. Such a system is disclosed in copending patent application Ser. No. 07/346,864, entitled "Digital Video Image Signal Processing, Control, and Display," invented by Robert L. Lay, et al., docket no. M-683, incorporated by reference. A system compatible with only subsets of the MDL, such as CMX compatible systems, typically requires manual intervention to assemble a completed sequence of any complexity.

The system uses conventional time codes as an important element for video editing. Time code and particularly SMPTE (Society of Motion Picture & Television Engineers) time code is a numerical reference system well known in the art which is recorded directly on video tape and which allows access to any field ($\frac{1}{60}$th of a second) or frame ($\frac{1}{30}$th of a second) on the tape by designating the tape numerical reference for the particular frame. The time code is thus an electronic labelling system that identifies each single frame on a video tape by a series of numbers indicating hours, minutes, seconds and number of frames and fields recorded. The edit decision list essentially is a list of event times with an indication of what is to be done with the frames that begin or end at that time codes indicated by the event. The MDL is an extension of the EDL which is oriented by key frames assigned times directly or indirectly to become events. Since the time codes are standardized in the video industry, such an edit decision list is usable by commercial post-production services or other editors in order to edit the video tape from the edit decision list.

Figure 1:
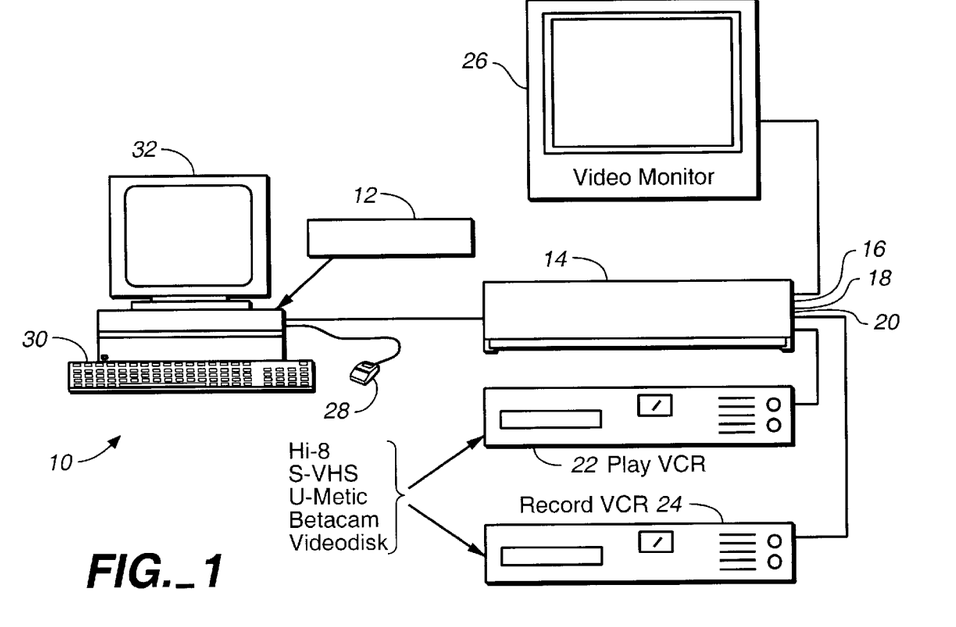
FIGS. 1 and 2 show a disk-assisted editing system in accordance with the invention.

One embodiment of the present invention is the VIDEO F/X system commercially available from Digital F/X, Inc., Mountain View, Calif. This system as shown in FIG. 1 uses a conventional Macintosh II computer 10 as a platform. A digital frame buffer 12 is a card conventionally inserted into the Macintosh computer 10. Also provided is a separate chassis 14 which includes a video switcher 16, an audio mixer 18, and machine control circuitry 20. Two or more commercially available VCRs or VTRs 22, 24 are connected to chassis 14 as is a conventional video monitor 26. Also provided is software (not shown) for video production and graphics and providing on-line editing capabilities. The software is conventionally installed in the Macintosh computer 10.

This system provides a full video production system using the standard Macintosh graphical user interface operated by mouse 28 and keyboard 30 which are part of the computer 10. Conventionally various windows are shown on the computer screen 32 for control of the editing process.

As would be understood by one skilled in the art, in other embodiments other computer systems are used as the platform and for user interface purposes.

Figure 2:
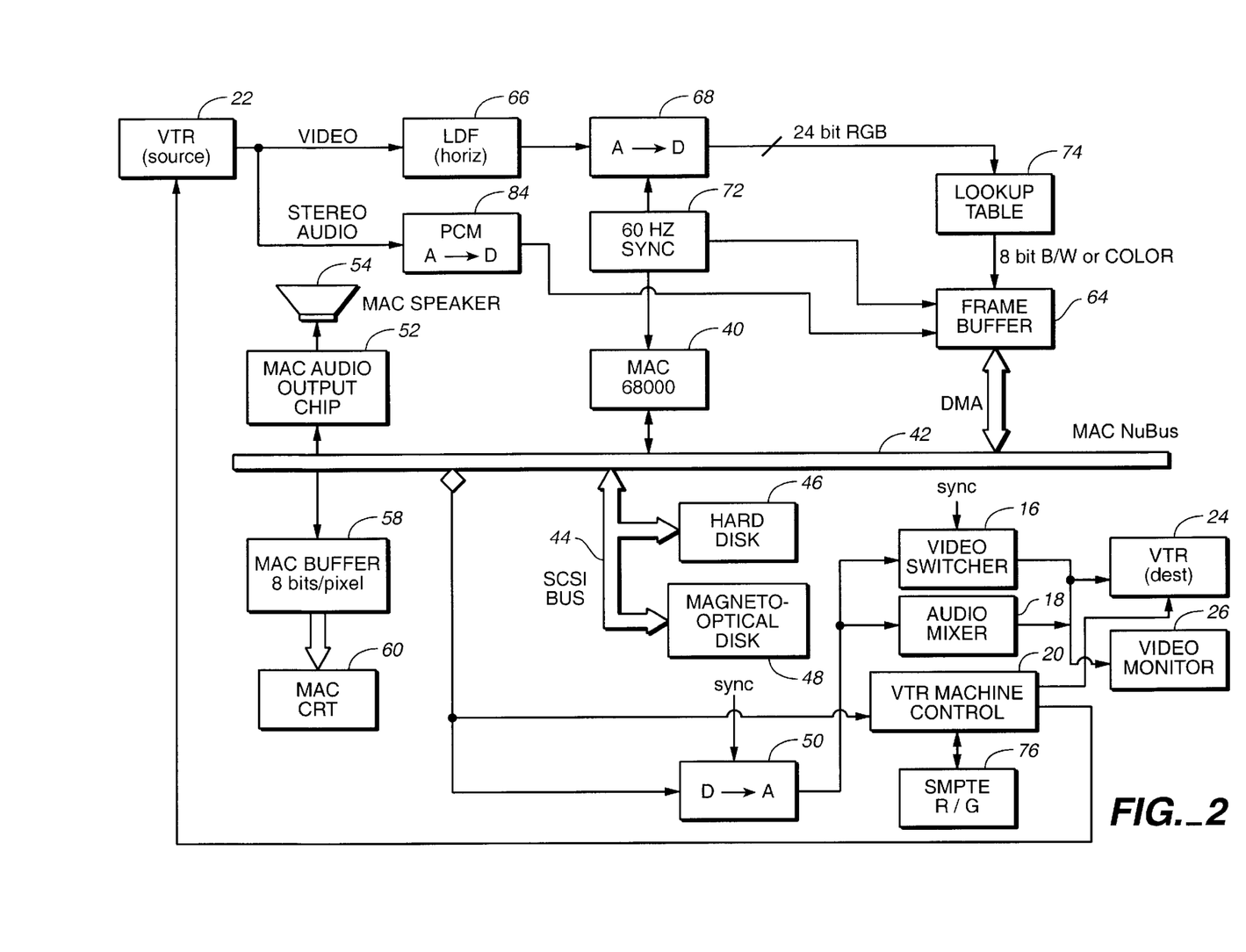

The system of FIG. 1 is shown in more detail in FIG. 2. In FIG. 2, computer 10 of FIG. 1 includes a 68000 series microprocessor 40, which is the central processing unit for computer 10. Microprocessor 40 is connected to the NuBus 42 which is a portion of computer 10. Connected to the NuBus 42 is a SCSI interface 44 (port) connectable to a conventional magnetic (hard) disk 46 or a magneto-optical disk 48 or a floppy tape (not shown) or other storage device. NuBus 42 is also connectable to an Ethernet network (not shown) which may connect to other storage devices. NuBus 42 connects to switcher 16 and mixer 18 via digital to analog converter 50.

Also conventionally in computer 10 is an audio output chip 52 which drives the Macintosh speaker 54 for providing audio output. Connected to the NuBus 42 is the Macintosh buffer 58 which provides video and 8 bits of data per pixel for the Macintosh CRT 60, i.e., display screen. Provided in the add-on board 12 (see FIG. 1) which is inserted in computer 10 as discussed above, is a 32 bit digital frame buffer (DFB) 64 which includes approximately 1.5 megabytes of memory. Provided in chassis 14 is a low pass filter (LPF) 66 for filtering the horizontal video pixels from source VTR 22. This horizontal filtering improves the quality of the video as the video is recorded to the disk storage since the video is compressed by being sampled horizontally at less than video resolution (sub-Nyquist sampling).

The output of filter 66 is provided to a conventional analog to digital converter 68 which outputs 24 bit RGB video. Converter 68 is controlled by a conventional sync generator 72 which includes a crystal providing a 60 Hz sync signal for vertical synchronization of the video. Alternatively for European and other countries that use the PAL video system instead of the American NTSC system, field rates are 50 per second and frame rates are 25 per second. Sync generator 72 also provides the sync signals to microprocessor 40. Sync generator 72 also conventionally provides timing for frame buffer 64, and video switcher 16.

The 24 bit RGB video is converted by look-up table 74 to 8 bit black and white or color video. Look-up table 74 is connected to digital frame buffer 64. As is known, high quality video requires typically 24 bits per picture element (pixel). In order to compress the video to only 8 bits per picture element, the user can choose digitizing only the luminance values, black and white, or color picture. With only 256 colors (8 bits) to digitize to, the look-up table 74 provides a default selected palette that matches typical video scenes such as flesh tones. Non-NTSC legal RGB colors, very saturated colors, and numerous color choices in very dark and very white areas of the scene are omitted. In another embodiment, in addition to low pass horizontal filtering of the video, low pass vertical filtering is also provided. The filtering provides improved video quality while video compression is used to conserve disk space.

A conventional SMPTE reader/generator (R/G) 76 puts SMPTE time code on the video tape in VTR's 22, 24 and reads back time code from the video tape. Reader/generator 76 is located in chassis 14 (see FIG. 1) and connects directly to machine control 20.

As shown, an adaptive PCM (pulse code modulation) analog to digital converter 84 is also connected to source VTR 22 to provide data to frame buffer 64. Converter 84 receives stereo audio from a VTR 22 as shown. Thus the audio data and video data are accepted separately and form separate data files in the master decision list to allow editing the audio separate from the video.

Microprocessor 40 controls transferring of information from frame buffer 64 by a DMA (direct memory access) transfer and/or processor controlled memory data moves via NuBus 42 to SCSI port 44 and thence to disk drives 46, 48. Audio data is also sent to frame buffer 64 and stored as described above in separate files in the disk drives 46, 48. The PCM converter 84 is conventional for digitizing audio inputs. Audio output chip 52 and 35 Macintosh speaker 54 provide low quality audio ("scratch" track quality), which is however adequate for editing purposes.

In one version, magneto-optical disk 48 is used for removable storage, or other removable storage devices (such as optical disks) or local area networks such as Ethernet are used so that the entire system may be used as virtual video tape recorders replacing actual source and record VTR's for editing.

In accordance with the invention, the conventional SMPTE time codes which are put on the video tape are equated to locations on hard disk 46, and these time codes are stored as the edit decision list in the memory (not shown) of computer 10. Also connected to the NuBus 42 and controllable by microprocessor 40 are a video switch mixer 16, an audio mixer 18, and a VTR machine control 20 for control of the source and destination VTRs 22, 24. Source and destination VTRs 22, 24 need not be identical machines. Preferably commercial-type source and destination VTRs are used to provide better quality video material and allow better recording thereof for the final product. The system is compatible with any of the usual video recording formats i.e., Hi-8, S-VHS, U-matic, Beta Cam, video-disk or the other well-known video recording standards.

Also provided is computer software (the source code of which is shown in the Microfiche Appendix with explanatory comments) for enabling disk-based editing. The software as discussed above is resident on the computer 10 and in one embodiment is primarily in the C language.

Figure 3:
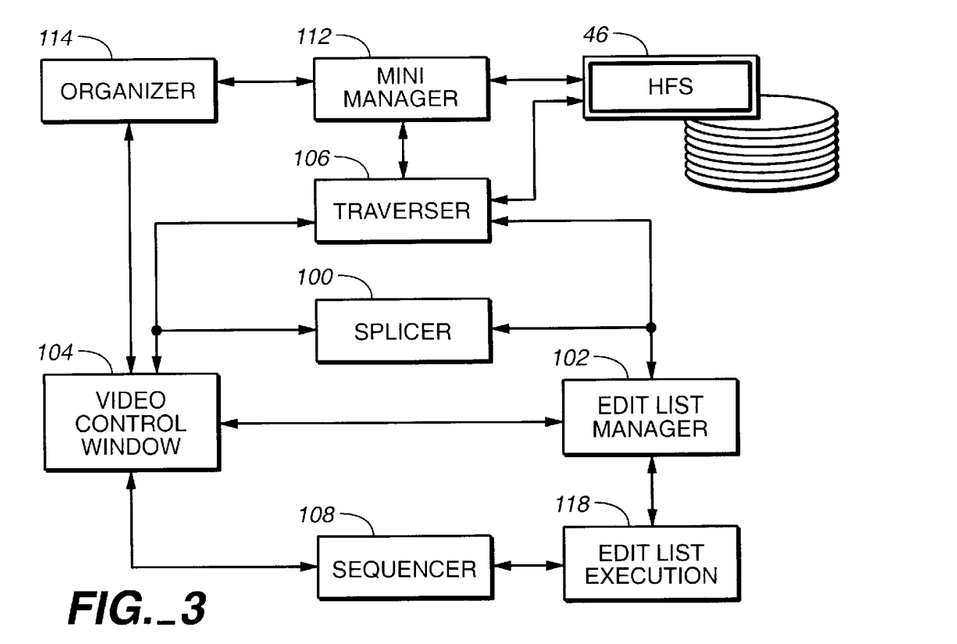
FIGS. 3 and 4 show software in accordance with the invention.

The computer software (see FIG. 3) for disk-based editing is in the following modules:

1. The Splicer module 100 takes the edit (master decision) list maintained by an Edit List Manager 102 (ELM) and produces a Segment List of the disk-based clips and synthesizes clips as necessary to simulate transitions and keyer functionality. The Splicer 100 is called directly from a Video Control Window 104 to update a given section of the segment list.
2. The Traverser module 106 takes the segment list maintained by the Splicer module 100 and plays the clips from disk. Traverser 106 is called from the Video Control Window 104 instead of the Sequencer 108 (which handles tape). The communication between the Splicer 100 and the Sequencer 108 is via the segment list common between them.

The Traverser 106 loads miniatures from disk 46 to memory before a playback and storing the miniatures from memory to disk 46 (hard file system). Miniatures are visual representations of stored video material which are displayed on the screen of computer 10 as a small sized image in a window, at a speed of 30 frames per second.

3. The Mini Manager module 112, where a Mini is a compressed miniature representing a given frame of video. Mini's are used in the Video Control Window 104 to represent clip (video scene) position and in the Organizer 114 to represent the clips used in a given edit list. These miniatures are also used as the disk-based clips. The Mini Manager 112 keeps track of what miniatures were on disk and where on disk they were stored and determines the position and validity of disk-based clips.

User Interface for Disk-based Editing

To transfer video from tape to disk, the user (i.e., editor) selects the clip to be copied from tape to disk using the commands for selecting video clips in the Video Control Window (VCW) 104. The user mounts a tape in the source VTR and sets the mark in and mark out points. A button is added to the VCW 104, labelled 'LOG'. This log button applies the selected clip to the special digitized video library which initiates the copy from tape to disk.

The existing user interface has "projects" (productions) each of which include an organizer and an edit sheet. The application can have more than one project open at any time. For disk-based editing, the "library" is a collection of editable objects that have no record time data associated with them. The user is only able to view a library in the existing organizer view. Because there is no record time for the objects, the user will not see the library in an edit sheet format. Libraries can be sorted by (1) object name or title, (2) creation date, or (3) source tape.

When digitized video is created on disk, the clip with the source information and mark in/mark out times (SMPTE start and stop) is put into this special library. The clip is an object available to user controlled edit lists. This object orientation help keeps the data on the disk associated with the audio and video sequenced in time order and sequential on the disk for better disk efficiency (by reducing disk accesses) and protects against modifying a source clip in one edit sequence that may be used in other edit sequences.

The difference between this special library and a general purpose video library is that it is write-protected. Users cannot change the general description of the object. This description consists of (1) disk space used, (2) the original source tape and in/out time codes, and (3) where that clip is used in currently open projects or libraries. Users are able to change the object name or title. However, since this title is used for the HFS filename of the data on disk, this title is the unique file name. In one embodiment, users are not able to cut/copy/paste digitized video, and are only able to delete all of the selected digitized video objects for deleted unused portions of the selected objects with a user definable latency of x number of seconds on either side of a given clip.

To select disk-based video, the user brings the special digitized video library to the front and select any object in the organizer view (which for libraries is the only view). This clip is automatically queued in the Video Control Window 104. The user then adjusts the mark in/mark out points, and can apply that object to a project.

Provided in the system is a selection command (as a pull-down menu item) to change between disk-based editing and conventional tape based editing. In disk-based editing, when the user plays the record tape (i.e., executes the edit list on the record tape), he is really accessing the random access digitized video and audio data from the hard disk 46. While in disk-based editing mode, the edit list objects in the edit sheet and the organizer that are video clips are designated an icon that marks each object either as being on tape or on disk. If all video clips in the current edit list are on disk, the user is able to play the entire edit list. If one or more video clips are tape based, when the user plays the record tape he gets a miniature that says, "Sorry, source not available" for the duration of the tape based clip in the VCW. So, the user is still able to get a sense of the timing of the playback while working on a portion of the edit list. Another embodiment allows the user to intermix disk and tape segments.

Splicer Module

The segment list is used by the Splicer 100 and the Traverser 106. The edit list maintains the list of objects over time. There are five types of edit list objects. The general information stored for each edit list object (ELO) is: (1) any combination of video and audio tracks, (2) transparency flag (only valid for graphics), and (3) start and end times. The special information stored for a ELO is:

| OBJECTS | SPECIAL DATA FOR OBJECT |
| --- | --- |
| 1. Live Clip | tape identifier + source time code |
| 2. Background (Matte) | RGB color per video line |
| 3. Graphic | File Identifier |
| 4. Transition | Fader bar travel |
| | Current & new scene specification |
| | Wipe pattern, softness, color & orientation |
| 5. Place Holder | None |

The purpose is to add to the edit list, a segment list which contains some of the basic edit list information in a time dependent format, rather than object oriented, and a valid list which keeps track of which parts of the edit list have been recorded or, in the case of disk-based editing, synthesized.

The information that the Traverser 106 needs is: (1) the start time of a particular clip, (2) the duration, (3) whether the object is on disk or tape (i.e. the source of the clip), and (4) for disk-based objects, information that with the Mini Manager 112 will allow the Traverser to find the clip (both video and audio) on disk. A function is added to the Edit List Manager 102 to convert the edit list to a time-oriented ASCII file from which the CMX translation can work.

The segment list and valid list are built and maintained by the Splicer module 100. The edit list 118 is maintained by the Edit List Manager 102 and functions provided to query the state of this structure.

For the organizer window, a rectangular box representing a given object in the Organizer 114 window has an icon that shows which type of object it is. There is an icon for graphics objects, an icon for live clip object from tape, and an additional icon represent objects from disk.

Since the Splicer module 100 maintains the valid segment list regardless of whether the current state is tape or disk, the Splicer 100 is called by the Video Control Window 104 every time the edit list is updated so that the valid list can track the current edit list in progress. The functions called by the Video Control Window 104 are:

1. SPL_ValidateTimeSlice (start timecode, end timecode)

The user has recorded a section of the edit list to the record tape. This flags that a given segment of this record tape matches the current edit list in progress.

2. SPL_InvalidateTimeSlice (start timecode, end timecode)

The user has modified a section of the edit list, so that for the given segment the current edit list no longer matches the record tape.

3. SPL_AddTimeSlice (start timecode, end timecode)

The user has inserted a new section of the edit list and has rippled the remaining portion of the list.

4. SPL_UpdateSplicer (start timecode, end timecode)

This function rebuilds the segment list to match the edit list for a given section of the edit list.

The Splicer 100 calls on the Edit List Manager 102 to retrieve the information about the edit list objects to build the segment list. The edit list information is retrieved as the list of objects for at a given starting time code. There can be a maximum of five objects at a given point in time. An example of these five objects is: (1) a live clip and (2) a transparent graphic which together are referred to as "scene A", (3) a background (matte) and (4) a transparent graphic which together are referred to as "scene B" and (5) the transition between scene A and scene B. The transition is seen as the change from scene A to scene B. In a simple linear crossfade, scene A is the scene at the start of the fade and scene B is the scene at the end of the fade.

The functions called by the Splicer 100 to retrieve this information from ELM 102 are:

1. ELM_GetSegment (start timecode, &duration, &Edit List object ptr[9])

Given a start time code, ELM 102 returns the set of objects defined for that time code and the length of this set of objects (i.e. the length of time before there is a change to the set of objects in use).

The order for the object pointers in the array are:

[0]=background (or bottom) element of scene A
[1]=audio 1 element for scene A background
[2]=audio 2 element for scene A background
[3]=transparent (or top) element of scene A
[4]=transition element
[5]=background (or bottom) element of scene B
[6]=audio 1 element for scene B background
[7]=audio 2 element for scene B background
[8]=transparent (or top) element of scene B If the transition element is NULL, the elements of scene B is ignored.

Traverser Module

Figure 4:
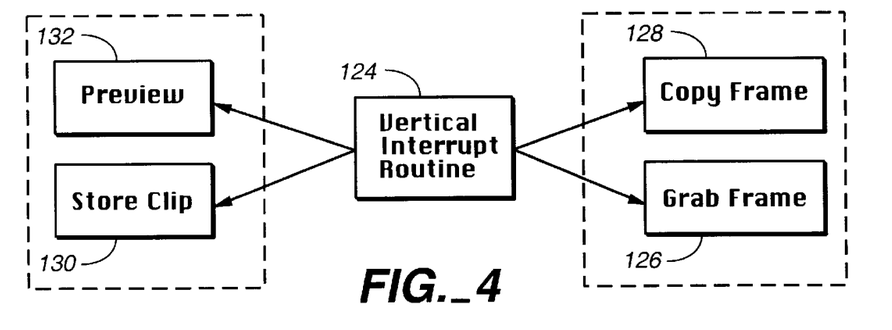

The Traverser 106 is in three parts: (1) the section that does the disk I/O for the miniatures used for playback into the Video Control Window 104, 92) the vertical interrupt task that triggers the calls to play a given miniature (both video and audio), and (3) the realtime miniature playback routines. The interaction of these three parts is shown in FIG. 4. FIG. 4 shows vertical interrupt routine 124 (occurring every ¹⁄₆₀ of a second) controlling the various functions. Grab frame 126 grabs a still (i.e., a frame) for a miniature. Copy frame 128 stores the grabbed frame on disk. The grabbed and copied frame is in one version the first (head) frame of a clip; it may also include the last (tail) frame of the clip. Store clip 130 digitizes video and audio and puts the digitized data on disk. Preview 132 allows the user to look at his program edits before they are recorded to the disk.

For global structures, the Traverser uses the segment list generated by the Splicer module as well as the information about the space on the screen where the playback will be shown. This structure is as follows: typedef struct

```
{
    GrafPtr     controlWindow;
    Boolean     upperLeftVisible;
    short       visibleWidth;
    short       visibleHeight;
} trv_PlayBack, *trv_PlayBackPtr;
```

This information is global so that the vertical interrupt task has access to it.

When the user starts the play command, the Traverser 106 (FIG. 3) takes as much memory as possible for storing playback miniatures. This memory (for the duration of the preview command) is organized as a circular linked list which contains (1) the pointer to the next list element, (2) whether that memory has been freed by the vertical interrupt task and ready for the next miniature off of disk, and (3) the miniature bitmap.

The interface of the Video Control Window 104 is as follows:

1. TRV_UpdateVCWPosition (GrafPtr controlwindow, Rect iconCordinates)

Because the Traverser 106 passes on position information to the realtime video/audio driver for the position of the playback miniature, the Traverser 106 needs to know every time the Video Control Window 104 is moved. So, this routine updates the trv—PlayBack structure that is used during realtime calls.

2. TRV_Play (start time, end time)

This routine previews a section of the edit list and breaks the segment to preview into disk-based clips vs. other clips. If a segment is not a disk-based clip, the calls that were previously made to ELM 102 are generated by this section of code (i.e. ELM_Preview ( )) for the segments of the edit list that have nothing to do with disk-based clips. For the disk-based clips, it begins off the vertical interrupt task which plays the next miniature in the video control window and loop waiting for either an miniature to become free so that it can retrieve the next miniature from disk or until the disk-based clip has been completely played.

3. TRV_Record (start time, end time)

This routine records a section of the edit list and runs down the valid segment list kept as part of the Splicer 100 and generates the calls to ELM for the sections of the record tape that are not valid.

The interface to the Mini Manager 112 is:

1. TRV_StoreClip (source tape, start time, end time)

At some point, the Mini Manager 112 stores a segment of tape to disk. This is the routine that handles that. When this function starts the proper tape is to be in the tape drive.

The routines for RealTime PlayBack are such that the realtime miniature playback routine is called from within the Traverser's 106 vertical interrupt routine.

1. DBE_CopyFrame (Ptr iconBitMap, trv_PlayBackPtr iconDestination)

This routine plays the miniature from memory to the Video Control Window 104. The iconDestination parameter is the Traverser global described above. It is assumed that the miniature (with both video and audio) is already in memory.

2. DBE_GrabFrame (Ptr iconBitMap)

This routine grabs the miniature from the Digital Frame Buffer and places it into the memory provided.

Mini Manager

The Mini Manager 112 keeps track of which clips are on disk and how to find them. There are two types of clips on disk: (1) the original source tape and the start and end timecodes on source tape and (2) the clips that are synthesized for a given transition between a disk-based clip and another object. The Mini Manager 112 also keeps track of which of these synthesized clips are in use at a given time and delete them when appropriate. For example, synthesized clips should all be deleted when the application is closed, when the user selects a new or saved edit list to work on, and the synthesized clips not in use should be deleted when more space is needed on the disk to store an incoming clip.

For global structures, the first pass of the Mini Manager 112 uses the Apple HFS 46 (hard disk file system) to manage the clips. Each clip is a separate file so fragmentation handling is a problem. The clip files are stored in separate folders under the project with one folder per source tape. One advantage of having a separate file per clip is that individual clips or all the clips for a given tape (i.e. all the files in a given folder) are easily archived.

The Mini Manager 112 keeps track of the following information for each disk clip: (1) file identifier, (2) full edit list object description of the clip, (3) duration of clip, (4) whether the clip is a duplicate of source tape or a synthesized section of video to simulate a transition or key, and (5) whether the clip is in use for the current edit list.

The Mini Manager 112 has two functions, (1) creating and deleting the physical files for digitized video on the hard disk and (2) translating between a source identifier and a data file.

1. MINI_NewDV (Source Identifier, Mark In, Mark Out, type)

This routine create a file on disk for the incoming digitized video data and adds a new entry to the special DV library that tracks all digitized video data on disk. The type field refers to whether this is video that has been logged by the user or video that is generated within the system to simulate keys or transitions. Internally generated or synthesized video has a special unique source identifier. It is also maintained by the Mini Manager 112, but not visible to the user in the DV [?WHAT IS DV?] library.

2. MINI_DeleteDV (Source Identifier, Mark In, Mark Out)

This routine deletes a file on disk. The entry in the DV library is removed by the organizer before it calls this function.

3. MINI_DeleteUnusedDV (Source Identifier, Mark In, Mark Out)

This routine deletes the portions of the digitized video not currently used by open projects. By a dialog box the user defines the latency as to how much video is kept on either side of the video in use. Since the segment list associated with each edit list keeps track of what clips from what sources are in use, it is a matter of searching through the segment list(s).

4. file reference number=MINI_OpenSource (Source Identifier, Mark In, Mark Out)

This routine opens the file containing the video data for a given source and sets the current position in the file to the right offset for the given mark in time.

5. MINI_CleanUp (Unused Flag)

This routine deletes synthesized video to release space on the disk. If the unused flag is set TRUE, only delete the synthesized video segments not in use. Otherwise delete all synthesized video.

Figure 5:
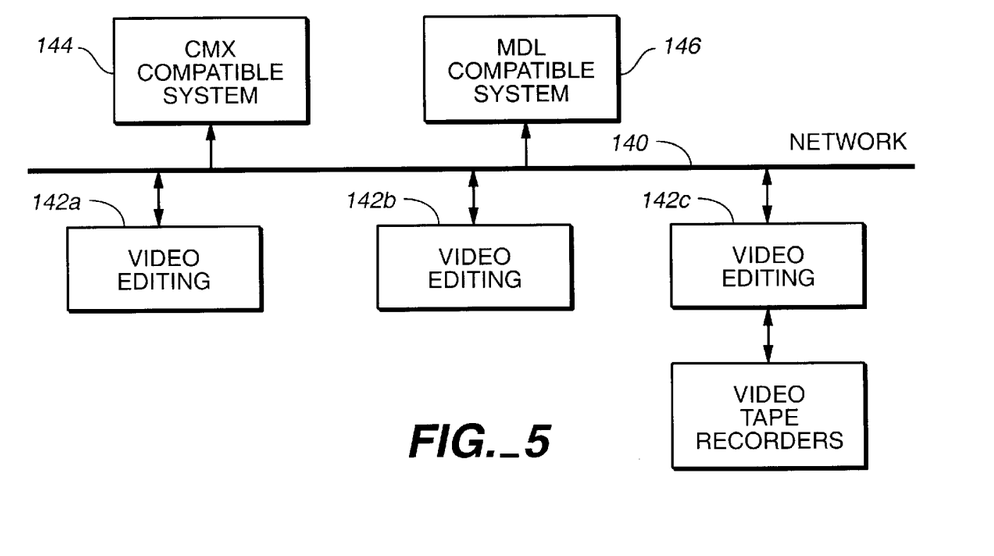
FIG. 5 shows a networked system in accordance with the invention.

Alternately (see FIG. 5) the disks can be connected by a local area network 140. Alternately, video editing workstations 142a, 142b, 142c would not have VTR's dedicated to them but available via a network 140 and conventional server architecture of client-peer or peer-peer structure, with a CMX compatible system 144 or MDL system 146. Alternately, some workstations 1429, 142b, 142c would not have full motion video or audio available but would only be able to work on the EDL, MDL, and still pictures.

For cache control, the user selects which video data is written from the source VTR's to the disk cache. The selected source start and stop times can be stated explicitly and activated with a record to disk command as shown in the above referenced software. In another embodiment, a user prescribed amount of source tape around a user-selected interest point is logged to disk. The cache can be flushed when the user selects update of the physical tape either incrementally on a scheme-by-scheme basis or by executing all of the edit list. Cache coherency is indicated to the user by showing which video segments have been successfully recorded from the physical source VTR or VTR's to the record VTR.

Figure 6A:
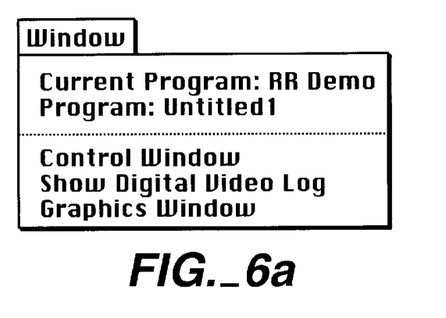
FIGS. 6a, 6b show operator control windows to enable disk modes.
Figure 6B:
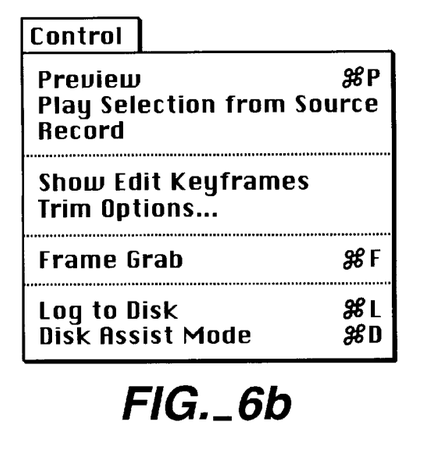

Although described above is a single source VTR system, multiple source VTR's may be used. The disk edit, or virtual tape, recorder can act as a virtual replacement for one or more of the source VTR's. Included in the system are user controlled selections to enable the use of the disks as mutual VTR's. See FIGS. 6a, 6b showing user control windows displayed on a Macintosh computer to enable disk record and display modes.

This patent disclosure includes copyrightable material. The copyright owner gives permission to make facsimile copies of the material in Patent Office files, but reserves all other copyright rights whatsoever.

The above description of the invention is illustrative and not limiting. Further embodiments of the invention will be apparent to one of ordinary skill in the art in the light of the above description and the appended claims.

We claim:

1. A method for editing video material using a video source device storing video source material, a storage device having faster access speed than the video source device, and a display coupled to the storage device, comprising the steps of:

transferring only a portion of a first video scene from the video source device to the storage device, the portion being a plurality of sequential video frames of the first video scene;

displaying on the display at least a part of the transferred video scene, the displayed part thereby representing all of the video scene;

automatically transferring only a portion of a second video scene from the video source device to the storage device when needed, the portion being a plurality of sequential video frames of the second video scene;

automatically deleting at least a part of the portion of the first video scene from the storage device when needed, thereby to provide additional storage capacity on the storage device; and creating an edit decision list of edit decisions for the video material.

2. The method of claim 1, further comprising the step of recording the video material directly from the video source device to a video destination device also having a slower access speed than the storage device, in accordance with the edit decision list.

3. The method of claim 1, wherein the steps of transferring each include the step of compressing the video material prior to storage on the storage device.

4. The method of claim 1, further comprising the step of creating separate files on the storage device for audio and video material from the video source device.

5. The method of claim 1, further comprising the step of editing full motion video, still frame video, graphics, and audio which is stored on the storage device.

6. The method of claim 1, wherein the steps of transferring each comprise the step of transferring a plurality of sequential video frames at the beginning and end of each video scene to the storage device.

7. The method of claim 1, wherein the step of automatically deleting deletes the video material which in a predetermined time period is least used.

8. The method of claim 1, wherein the steps of transferring each comprise the steps of;
- transferring the video material from the video source device to a frame buffer;
- looking up in a table which color from a preselected range of colors is to be assigned to each pixel in the video material; and
- transferring to the storage device information relating to the preselected color for each pixel.

9. The method of claim 1, wherein the plurality of sequential video frames of the first video scene and the second video scene are each at least a few seconds of video.

10. A video editing system comprising:
- a video source device for storing video source material;
- a processing unit coupled to the video source device;
- a storage device having a faster access speed than the video source device, and coupled to the processing unit;
- a video display coupled to the processing unit;
- means for transferring only a portion of a first video scene from the video source device to the storage device, the portion being a plurality of sequential video frames of the first video scene;
- means for displaying on the display at least a part of the transferred video scene, the displayed part thereby representing all of the video scene;
- means for automatically transferring only a portion of a second video scene from the video source device to the storage device when needed by the processing unit, the portion being a plurality of sequential video frames of the second video scene;
- means for automatically deleting at least a part of the portion of the first video scene from the storage device when needed by the processing unit, thereby to provide additional storage capacity on the storage device; and
- means for creating an edit decision list of edit decisions for the video material.

11. The system of claim 10, further comprising:
- a video destination device connected to the processing unit and to the video source device and having a slower access speed than the storage device; and
- means for directly recording video material from the video source device to the video destination device, in accordance with the edit decision list.

12. The system of claim 10, wherein the storage device stores full motion video, still video frames, graphics and audio.

13. The system of claim 10, wherein the processing unit creates separate files on the storage device for audio material and video material from the video source device.

14. The system of claim 13, wherein the processing unit creates separate files on the storage device for graphics material.

15. The system of claim 10, wherein the processing unit includes means for compressing the video material form the video source device for storage on the storage device.

16. The system of claim 15, wherein the means for compressing performs horizontal, vertical, temporal, and colormetric compression.

17. The system of claim 16, wherein-the colormetric compression is performed by a look-up table to match colors used in typical video scenes.

18. The system of claim 10, wherein the means for automatically deleting removes video material from the storage device upon occurrence of a predetermined event.

19. The system of claim 10, wherein the portion of each video scene is a plurality of sequential video frames at the beginning and end of video scene.

20. The system of claim 11, wherein the processing unit includes means for automatically logging material from the video source device to the storage device, and also includes means for automatically editing the video scenes stored on the storage device for recordation onto the video destination device.

21. The system of claim 10, wherein the processing unit includes means for establishing a list of time codes, wherein each time code relates to a video frame stored on the video source device.

22. The system of claim 10, wherein the plurality of sequential video frames of the first video scene and the second video scene are each at least a few seconds of video.

* * * * *

UNITED STATES PATENT AND TRADEMARK OFFICE
CERTIFICATE OF CORRECTION

PATENT NO.    : 6,201,924 B1
DATED         : March 13, 2001
INVENTOR(S)   : Stephen E. Crane, LeeAnn Herringer, Michael Shinsky, Gerald A. Raitzer, Michael A. Ogrinc and Stephen T. Mayer It is certified that error appears in the above-identified patent and that said Letters Patent is hereby corrected as shown below:

<u>Title page,</u>
Item [75] Inventors, please delete "Heringer" and insert -- Herringer -- therefor.

Signed and Sealed this

Eleventh Day of December, 2001

Attest:

*Nicholas P. Godici*

NICHOLAS P. GODICI
*Attesting Officer*  *Acting Director of the United States Patent and Trademark Office*